United States Patent [19]

Kato et al.

[11] Patent Number: 5,238,887
[45] Date of Patent: Aug. 24, 1993

[54] CERAMIC COMPOSITION FOR MICROWAVE DIELECTRIC

[75] Inventors: Tokiomi Kato; Hirofumi Ozeki, both of Nagoya, Japan

[73] Assignee: NGK Spark Plug Company, Ltd., Aichi, Japan

[21] Appl. No.: 907,640

[22] Filed: Jul. 2, 1992

[30] Foreign Application Priority Data

Jul. 4, 1991 [JP] Japan .................. 3-190690

[51] Int. Cl.$^5$ ............................. C04B 35/46
[52] U.S. Cl. ................................ 501/138
[58] Field of Search ............ 501/138, 135, 139

[56] References Cited

U.S. PATENT DOCUMENTS

| Re. 29,484 | 11/1977 | Utsumi et al. | 501/138 |
| 4,487,842 | 12/1984 | Nomura et al. | 501/135 |
| 4,803,591 | 2/1989 | Miyashita et al. | 501/138 |
| 4,968,649 | 11/1990 | Tsurumi et al. | 501/138 |

FOREIGN PATENT DOCUMENTS

| 1113407 | 8/1901 | Fed. Rep. of Germany | 501/139 |
| 0014464 | 5/1970 | Japan | 501/138 |
| 0134902 | 10/1980 | Japan | 501/139 |
| 61-10806 | 1/1986 | Japan . |
| 61-10807 | 1/1986 | Japan . |
| 63-117957 | 5/1988 | Japan . |
| 1-37807 | 8/1989 | Japan . |

*Primary Examiner*—Mark L. Bell
*Assistant Examiner*—Deborah Jones
*Attorney, Agent, or Firm*—Finnegan, Henderson, Farabow, Garrett & Dunner

[57] ABSTRACT

Disclosed herein is a ceramic composition which gives a microwave dielectric having a permittivity and unloaded Q in a practical range and a small temperature coefficient ($\tau f$) in the neighborhood of zero of resonance frequency owing to the controlled amount of ZnO and $Ta_2O_5$ added. The $\tau f$ value may be positive or negative in the neighborhood of zero according to need. The ceramic composition comprises a principal component represented by $(BaO-3.7TiO_2) \cdot xZnO$, where x is in the range of $15 \leq x \leq 17$ wt % and a secondary component containing 2-6 wt % $Ta_2O_5$ and not more than 1 wt % $MnO_2$ based on the amount of the principal component. The ceramic composition may also contain $BaO-3.8TiO_2$, 12-16 wt % ZnO, and 2-6 wt % $Ta_2O_5$, or contain $BaO-3.6TiO_2$, 17-19 wt % ZnO, and 2-6 wt % $Ta_2O_5$.

6 Claims, 3 Drawing Sheets

BaO·3.8TiO₂ +4wt%Ta₂O₅ based

Firing temp.
○ 1200°C
△ 1225°C
□ 1250°C

BaO·3.8TiO₂ +14wt%ZnO based

Firing temp.
○ 1200°C
△ 1225°C
□ 1250°C $BaO \cdot 3.7TiO_2 + 4wt\% Ta_2O_5$ based $BaO \cdot 3.7TiO_2 + 17wt\% ZnO$ based BaO·3.6TiO₂ +4wt%Ta₂O₅ based BaO·3.6TiO₂ +19wt%ZnO based

CERAMIC COMPOSITION FOR MICROWAVE DIELECTRIC

BACKGROUND OF THE INVENTION

1. Field of the Invention

The present invention relates to a ceramic composition for a microwave dielectric (simply referred to as a dielectric ceramic composition), said microwave dielectric having a temperature coefficient of resonance frequency (simply referred to as $\tau f$ hereinafter) which is close to zero or has any controlled positive or negative value depending on the amount of ZnO added.

The microwave dielectric pertaining to the present invention will be used for microwave dielectric resonators, microwave IC substrates, and impedance matching in microwave circuits etc.

2. Description of the Prior Art

There are several known dielectric ceramic compositions which are represented by $BaO.3.9\text{-}4.1TiO_2 \cdot xZnO$ (Japanese Patent Publication No. 37807/1989), $BaO.4TiO_2.x\ ZnO.yTa_2O_5$ (Japanese Patent Laid-open No. 10806/1986), $BaO.4TiO_2.x\ ZnO.yWO_3$ (Japanese Patent Laid-Open No. 10807/1986), and $BaO.wTiO_2.x\text{-}Ba(Zr_{1/3}Ta_{2/3})O_3.yTa_2O_5.zMnO_2$ (Japanese Patent Laid-open No. 117957/1988).

Of the above-mentioned four dielectric ceramic compositions, the first three vary in $\tau f$ (which ranges from positive to negative) depending on the amount of additives. However, they are often poor in sinterability, and there has been a demand for a new dielectric ceramic composition of different make-up which is comparable or superior to the conventional ones in performance. And the last one does not have negative $\tau f$ values.

SUMMARY OF THE INVENTION

The present invention was completed in view of the foregoing. It is an object of the present invention to provide a dielectric ceramic composition for a microwave dielectric which has a small $\tau f$ value close to zero, or any desired positive or negative $\tau f$ value depending on the amount of ZnO and $Ta_2O_5$ added, while maintaining the permittivity (simply referred to as $\epsilon r$ hereinafter) and unloaded Q (simply referred to as Qu hereinafter) in a practical range.

The present inventors carried out a series of researches on a variety of dielectric ceramic compositions of $(BaO\text{-}xTiO_2).yZnO.zTa_2O_5$ systems which has a small $\tau f$ value close to zero, while maintaining $\epsilon r$ and Qu in a practical range. As the result, the present invention was accomplished.

In a first preferred embodiment of the present invention, a ceramic composition for microwave dielectric comprises a principal component composed of BaO, $TiO_2$ and ZnO, and a secondary component, said principal component being represented by $(BaO\text{-}3.8TiO_2).xZnO$, where x is in the range of $12 \leq x \leq 16$ wt % based on the amount of $BaO\text{-}3.8TiO_2$, said secondary component containing 2-6 wt % $Ta_2O_5$ based on the amount of the principal component.

In a second preferred embodiment of the present invention, a ceramic composition for microwave dielectric comprises a principal component composed of BaO, $TiO_2$ and ZnO, and a secondary component, said principal component being represented by $(BaO\text{-}3.7TiO_2).xZnO$, where x is in the range of $15 \leq x \leq 17$ wt % based on the amount of $BaO\text{-}3.7TiO_2$, said secondary component containing 2-6 wt % $Ta_2O_5$ based on the amount of the principal component.

In a third preferred embodiment of the present invention, a ceramic composition for microwave dielectric comprises a principal component composed of BaO, $TiO_2$ and ZnO, and a secondary component, said principal component being represented by $(BaO\text{-}3.6TiO_2).xZnO$, where x is in the range of $17 \leq x \leq 19$ wt % based on the amount of $BaO\text{-}3.6TiO_2$, said secondary component containing 2-6 wt % $Ta_2O_5$ based on the amount of the principal component.

In a fourth preferred embodiment of the present invention, a ceramic composition for microwave dielectric comprises a principal component composed of BaO, $TiO_2$ and ZnO, and a secondary component, said principal component being represented by $(BaO\text{-}3.7\sim3.8TiO_2).xZnO$, where x is in the range of $12 \leq x \leq 17$ wt % based on the amount of $BaO\text{-}3.7\sim3.8TiO_2$, said secondary component containing 2-6 wt % $Ta_2O_5$ based on the amount of the principal component, and $\tau f$ values is in the range of $-5$ to $+5$ ppm/°C.

In a fifth preferred embodiment of the invention, a ceramic composition for microwave dielectric comprises a principal component composed of BaO, $TiO_2$, and ZnO, and a secondary component, said principal component being represented by $(BaO\text{-}3.6\sim3.7TiO_2).xZnO$, where x is in the range of $15 \leq x \leq 19$ wt % based on the amount of $BaO\text{-}3.6\sim3.7TiO_2$, said secondary component containing 2-6 wt % $Ta_2O_5$ based on the amount of the principal component, and a temperature coefficient of resonance frequency $\tau f$ values is in the range of $-5$ to $+5$ ppm/°C.

In a sixth preferred embodiment of the invention, a ceramic composition for microwave dielectric as defined in any of the first to fifth embodiments, further comprises $MnO_2$ in an amount not more than 1 wt % of the amount of the ceramic composition.

The dielectric ceramic composition of the present invention is represented by $[(BaO.xTiO_2).yZnO].zTa_2O_5$, with x, y, and z having specific values as defined in the first to fifth embodiments, so that the resulting microwave dielectric has the $\tau f$ value close to zero, while maintaining the Qu and $\epsilon r$ values in a practical range (Qu$\geq$2200, $\epsilon r \geq$26). The $\tau f$ value ranges from $+4.9$ to $-1.7$ in the first embodiment, from $+2.5$ to $-1.4$ in the second embodiment, from $+4.1$ to $-1.0$ in the third embodiment and from $+5$ to $-5$ in the fourth and fifth embodiments.

The composition contains ZnO which improves Qu and $\epsilon r$ and also contains $Ta_2O_5$ which improves Qu and permits the control of $\tau f$.

The composition may optionally contain $MnO_2$ which permits the composition to be sintered stably at a comparatively low temperature. The amount of $MnO_2$ in not more than 1 wt % has effect enough. The amount of $MnO_2$ in excess of 1 wt % has an adverse effect on the dielectric properties.

According to the present invention, the dielectric ceramic composition is prepared by mixing BaO, $TiO_2$, ZnO, $Ta_2O_5$, and $MnO_2$ (all in powder form) according to the formula and calcining the mixture. The calcined powder is formed into a desired shape, which is subsequently sintered.

According to the present invention, the dielectric ceramic composition is represented by any one of the following formulas:

①[BaO-3.8 (mol) $TiO_2$.x (wt %) ZnO ($12 \leq x \leq 16$)].2-6 (wt %) $Ta_2O_5$.0.2 (wt %) $MnO_2$, or ②[BaO-3.7 (mol) TiO$_2$.x (wt %) ZnO (15≦x≦17)].2-6 (wt %) Ta$_2$O$_5$.0.2 (wt %) MnO$_2$, or ③[BaO-3.6 (mol) TiO$_2$.x (wt %) ZnO (17≦x≦19)].2-6 (wt %) Ta$_2$O$_5$.0.2 (wt %) MnO$_2$, It gives rise to a microwave dielectric which has a τf value close to zero while maintaining εr and Qu in a practical range. It also has a desired positive or negative τf value depending on the amount of ZnO or Ta$_2$O$_5$ added.

DESCRIPTION OF THE PREFERRED EMBODIMENTS

Figure 1:
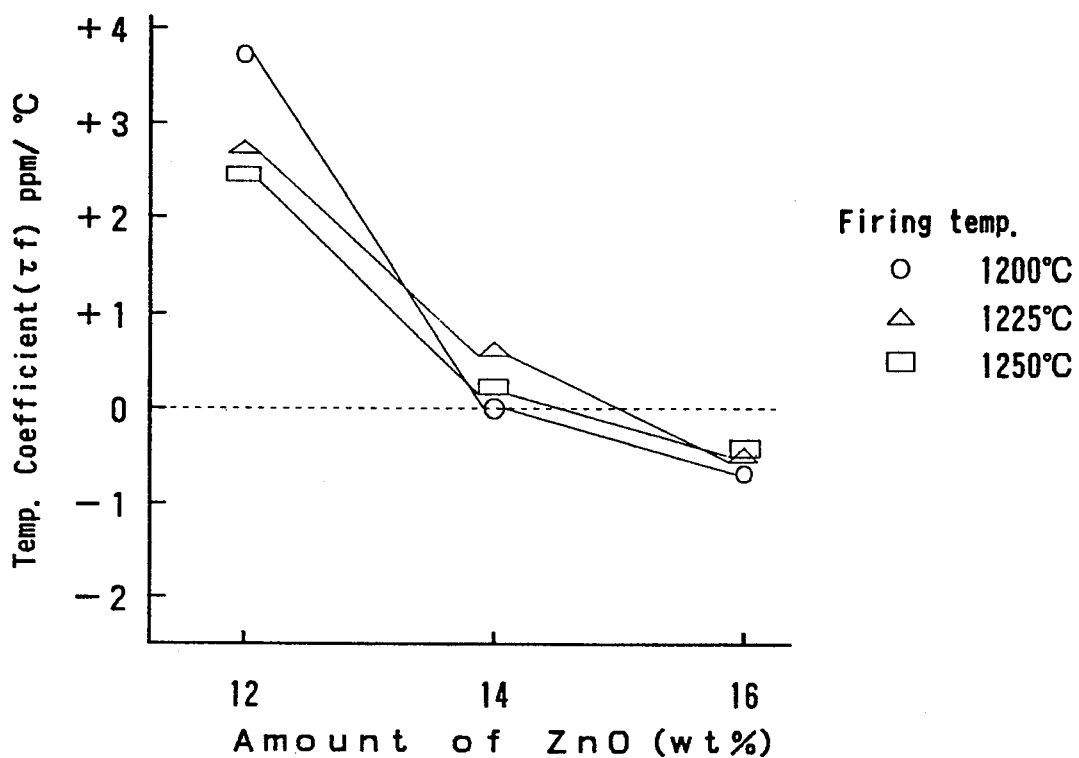
FIG. 1 is a graph showing the relationship between the τf value and the amount of ZnO at different sintering temperatures for the BaO-3.8TiO$_2$-based dielectric ceramic composition.

The invention will be described in more detail with reference to the following example.

(1) Preparation of samples

Five starting materials, BaCO$_3$, TiO$_2$, ZnO, Ta$_2$O$_5$, and MnO$_2$, all in powder form and 99.9% pure, were weighed according to the formula below.

[BaO-y (mol) TiO$_2$.x (wt %) ZnO].z (wt %) Ta$_2$O$_5$.0.2 (wt %) MnO$_2$ where:

when y is 3.8, x is 12, 14, or 16, and z is 4, as shown in Table 1;

when y is 3.8 and x is 14, z is 2, 4, or 6, as shown in Table 2;

when y is 3.7, x is 15, 16, or 17, and z is 4, as shown in Table 3;

when y is 3.7 and x is 17, z is 2, 4, or 6, as shown in Table 4;

when y is 3.6, x is 17, 18, or 19, and z is 4, as shown in Table 5; and when y is 3.6 and x is 19, z is 2, 4, or 6, as shown in Table 6.

Incidentally, each amount of ZnO, Ta$_2$O$_5$, and MnO$_2$ is expressed in terms of wt % (parts by weight) of the total amount (100 parts by weight) of BaCO$_3$-yTiO$_2$. They were mixed and crushed by dry process using a mixer, and the mixture was calcined at 900°–1100° C. for 2 hours. The calcined product was crushed together with an adequate amount of organic binder and 260–500 g of deionized water in a ball mill containing alumina balls (20 mm in diameter). The crushed product was granulated by spray drying. The granules were formed into a cylinder, 19.35 mm in diameter and 8 mm high, by pressing at 1000 kg/cm$^2$.

TABLE 1

(BaO-3.8TiO$_2$-based dielectric ceramic composition)

| Sample No. | Additives (wt %) ZnO | Additives (wt %) Ta$_2$O$_5$ | Firing temperature (°C.) | Firing density (g/cm$^3$) | Relative permittivity ($\epsilon_r$) | Qu value (at 4.5 GHz) | Temperature coefficient (τf) ppm/°C. |
|---|---|---|---|---|---|---|---|
| 1 | 12 | 4 | 1175 | 3.81 | 23.1 | 700 | 7.80 |
| 2 | 14 | 4 | 1175 | 4.54 | 30.9 | 3270 | −0.57 |
| 3 | 16 | 4 | 1175 | 3.94 | 23.8 | 1350 | −1.69 |
| 4 | 12 | 4 | 1200 | 4.45 | 30.4 | 3040 | 3.85 |
| 5 | 14 | 4 | 1200 | 4.68 | 32.3 | 3250 | 0.00 |
| 6 | 16 | 4 | 1200 | 4.51 | 30.1 | 3200 | −0.74 |
| 7 | 12 | 4 | 1225 | 4.54 | 31.3 | 3120 | 2.89 |
| 8 | 14 | 4 | 1225 | 4.77 | 33.1 | 3050 | 0.70 |
| 9 | 16 | 4 | 1225 | 4.58 | 31.2 | 2860 | −0.50 |
| 10 | 12 | 4 | 1250 | 4.71 | 33.0 | 2840 | 2.57 |
| 11 | 14 | 4 | 1250 | 4.56 | 33.4 | 2840 | 0.21 |
| 12 | 16 | 4 | 1250 | 4.74 | 32.4 | 2670 | −0.46 |

TABLE 2

(BaO-3.8TiO$_2$-based dielectric ceramic composition)

| Sample No. | Additives (wt %) ZnO | Additives (wt %) Ta$_2$O$_5$ | Firing temperature (°C.) | Firing density (g/cm$^3$) | Relative permittivity ($\epsilon_r$) | Qu value (at 4.5 GHz) | Temperature coefficient (τf) ppm/°C. |
|---|---|---|---|---|---|---|---|
| 13 | 14 | 2 | 1175 | 3.99 | 25.1 | 530 | 7.30 |
| 14 | 14 | 4 | 1175 | 4.54 | 30.9 | 3270 | −0.57 |
| 15 | 14 | 6 | 1175 | 3.89 | Unmeasurable | Unmeasurable | Unmeasurable |
| 16 | 14 | 2 | 1200 | 4.55 | 30.8 | 3190 | 1.34 |
| 17 | 14 | 4 | 1200 | 4.68 | 32.3 | 3250 | 0.00 |
| 18 | 14 | 6 | 1200 | 4.43 | 29.6 | 3140 | −0.09 |
| 19 | 14 | 2 | 1225 | 4.64 | 31.7 | 2700 | 1.13 |
| 20 | 14 | 4 | 1225 | 4.77 | 33.1 | 3050 | 0.70 |
| 21 | 14 | 6 | 1225 | 4.60 | 31.1 | 3020 | −1.09 |
| 22 | 14 | 2 | 1250 | 4.72 | 32.6 | 2330 | 1.37 |
| 23 | 14 | 4 | 1250 | 4.56 | 33.4 | 2840 | 0.21 |

TABLE 2-continued (BaO-3.8TiO$_2$-based dielectric ceramic composition)

| Sample No. | Additives (wt %) ZnO | Ta$_2$O$_5$ | Firing temperature (°C.) | Firing density (g/cm$^3$) | Relative permittivity ($\epsilon_r$) | Qu value (at 4.5 GHz) | Temperature coefficient ($\tau f$) ppm/°C. |
|---|---|---|---|---|---|---|---|
| 24 | 14 | 6 | 1250 | 4.73 | 32.6 | 2550 | −0.09 |

TABLE 3

(BaO-3.7TiO$_2$-based dielectric ceramic composition)

| Sample No. | Additives (wt %) ZnO | Ta$_2$O$_5$ | Firing temperature (°C.) | Firing density (g/cm$^3$) | Relative permittivity ($\epsilon_r$) | Qu value (at 4.5 GHz) | Temperature coefficient ($\tau f$) ppm/°C. |
|---|---|---|---|---|---|---|---|
| 25 | 15 | 4 | 1250 | 4.85 | 33.7 | 2800 | 2.34 |
| 26 | 16 | 4 | 1250 | 4.81 | 33.0 | 2550 | 0.77 |
| 27 | 17 | 4 | 1250 | 4.84 | 32.8 | 2600 | −0.27 |
| 28 | 15 | 4 | 1225 | 4.82 | 33.6 | 2780 | 2.44 |
| 29 | 16 | 4 | 1225 | 4.73 | 32.2 | 2600 | 1.31 |
| 30 | 17 | 4 | 1225 | 4.83 | 32.7 | 2750 | −0.16 |
| 31 | 15 | 4 | 1275 | 4.83 | 33.7 | 2680 | 1.35 |
| 32 | 16 | 4 | 1275 | 4.82 | 33.2 | 2760 | 1.18 |
| 33 | 17 | 4 | 1275 | 4.86 | 33.0 | 2510 | −1.34 |
| 34 | 15 | 4 | 1200 | 4.68 | 32.2 | 3040 | 1.69 |
| 35 | 16 | 4 | 1200 | 4.30 | 27.7 | 2950 | 0.00 |
| 36 | 17 | 4 | 1200 | 4.77 | 32.0 | 2960 | −0.80 |
| 37 | 15 | 4 | 1175 | 4.54 | 30.6 | 2780 | 1.46 |
| 38 | 16 | 4 | 1175 | 4.11 | Unmeasurable | Unmeasurable | Unmeasurable |
| 39 | 17 | 4 | 1175 | 4.62 | 30.6 | 3210 | −1.16 |

TABLE 4

(BaO-3.7TiO$_2$-based dielectric ceramic composition)

| Sample No. | Additives (wt %) ZnO | Ta$_2$O$_5$ | Firing temperature (°C.) | Firing density (g/cm$^3$) | Relative permittivity ($\epsilon_r$) | Qu value (at 4.5 GHz) | Temperature coefficient ($\tau f$) ppm/°C. |
|---|---|---|---|---|---|---|---|
| 40 | 17 | 2 | 1175 | 4.13 | 25.9 | 2210 | 0.25 |
| 41 | 17 | 4 | 1175 | 4.62 | 30.6 | 3210 | −1.16 |
| 42 | 17 | 6 | 1175 | 4.00 | 22.7 | 1420 | −7.84 |
| 43 | 17 | 2 | 1200 | 4.30 | 30.5 | 2690 | 1.02 |
| 44 | 17 | 4 | 1200 | 4.77 | 32.0 | 2960 | −0.80 |
| 45 | 17 | 6 | 1200 | 4.44 | 28.3 | 2720 | −2.37 |
| 46 | 17 | 2 | 1225 | 4.62 | 31.3 | 2830 | 0.99 |
| 47 | 17 | 4 | 1225 | 4.83 | 32.7 | 2750 | −0.16 |
| 48 | 17 | 6 | 1225 | 4.64 | 30.4 | 3230 | −1.51 |
| 49 | 17 | 2 | 1250 | 4.75 | 32.7 | 2540 | 3.36 |
| 50 | 17 | 4 | 1250 | 4.84 | 32.8 | 2600 | −0.27 |
| 51 | 17 | 6 | 1250 | 4.84 | 32.4 | 2560 | −1.60 |

TABLE 5

(BaO-3.6TiO$_2$-based dielectric ceramic composition)

| Sample No. | Additives (wt %) ZnO | Ta$_2$O$_5$ | Firing temperature (°C.) | Firing density (g/cm$^3$) | Relative permittivity ($\epsilon_r$) | Qu value (at 4.5 GHz) | Temperature coefficient ($\tau f$) ppm/°C. |
|---|---|---|---|---|---|---|---|
| 52 | 17 | 4 | 1250 | 4.84 | 33.0 | 2600 | 3.54 |
| 53 | 18 | 4 | 1250 | 4.84 | 32.6 | 2590 | 1.71 |
| 54 | 19 | 4 | 1250 | 4.85 | 32.2 | 2490 | −0.61 |
| 55 | 17 | 4 | 1225 | 4.77 | 32.4 | 2780 | 4.07 |
| 56 | 18 | 4 | 1225 | 4.79 | 32.1 | 2300 | 0.55 |
| 57 | 19 | 4 | 1225 | 4.79 | 31.6 | 2530 | −0.98 |
| 58 | 17 | 4 | 1275 | 4.85 | 33.2 | 2460 | 3.39 |
| 59 | 18 | 4 | 1275 | 4.85 | 32.9 | 2690 | 2.12 |
| 60 | 19 | 4 | 1275 | 4.86 | 32.4 | 2560 | −0.39 |
| 61 | 17 | 4 | 1200 | 4.59 | 30.5 | 2990 | 2.67 |
| 62 | 18 | 4 | 1200 | 4.65 | 30.8 | 2920 | 0.95 |
| 63 | 19 | 4 | 1200 | 4.54 | 29.3 | 2900 | −0.35 |
| 64 | 17 | 4 | 1175 | 4.32 | Unmeasurable | Unmeasurable | Unmeasurable |
| 65 | 18 | 4 | 1175 | 4.50 | 29.2 | 1700 | 2.44 |
| 66 | 19 | 4 | 1175 | 4.30 | Unmeasurable | Unmeasurable | Unmeasurable |

TABLE 6

(BaO-3.6TiO$_2$-based dielectric ceramic composition)

| Sample No. | Additives (wt %) ZnO | Additives (wt %) Ta$_2$O$_5$ | Firing temperature (°C.) | Firing density (g/cm$^3$) | Relative permittivity ($\epsilon_r$) | Qu value (at 4.5 GHz) | Temperature coefficient ($\tau f$) ppm/°C. |
|---|---|---|---|---|---|---|---|
| 67 | 19 | 2 | 1175 | 4.36 | 27.8 | 1540 | 0.78 |
| 68 | 19 | 4 | 1175 | 4.30 | Unmeasurable | Unmeasurable | Unmeasurable |
| 69 | 19 | 6 | 1175 | 4.10 | 23.7 | 1740 | −2.41 |
| 70 | 19 | 2 | 1200 | 4.68 | 31.0 | 2650 | 0.72 |
| 71 | 19 | 4 | 1200 | 4.54 | 29.3 | 2900 | −1.35 |
| 72 | 19 | 6 | 1200 | 4.61 | 29.4 | 3090 | −1.49 |
| 73 | 19 | 2 | 1225 | 4.72 | 31.4 | 2810 | 0.59 |
| 74 | 19 | 4 | 1225 | 4.79 | 31.6 | 2530 | −0.98 |
| 75 | 19 | 6 | 1225 | 4.73 | 30.7 | 2940 | −0.72 |
| 76 | 19 | 2 | 1250 | 4.78 | 32.1 | 2480 | 0.46 |
| 77 | 19 | 4 | 1250 | 4.85 | 32.2 | 2490 | −0.61 |
| 78 | 19 | 6 | 1250 | 4.86 | 32.0 | 2900 | −0.78 |

The molded article was fired in the air at 1175°–1275° C. for 4 hours. Finally, the fired article was polished to give a cylindrical article, 16 mm in diameter and 6 mm in height. Thus there were obtained dielectric samples Nos. 1 to 78.

The samples were tested for $\epsilon r$, Qu and $\tau f$ by the parallel conductor plate type dielectric resonator method (TE$_{011}$ MODE) at a resonant frequency of 4.5 GHz. They were also tested for sintering density.

(2) Evaluation of Performance

Figure 2:
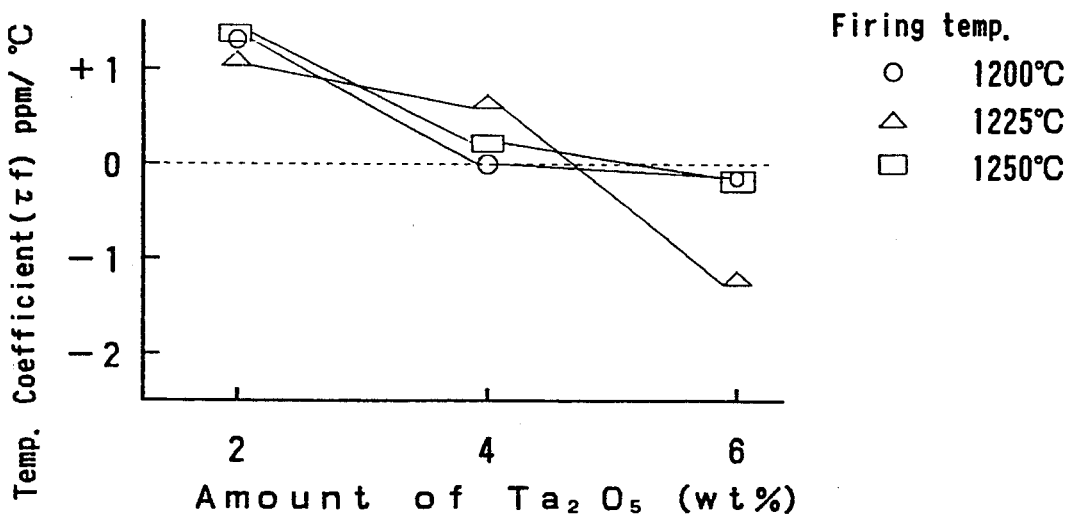
FIG. 2 is a graph showing the relationship between the τf value and the amount of Ta$_2$O$_5$ at different sintering temperatures for the BaO-3.8TiO$_2$-based dielectric ceramic composition.
Figure 3:
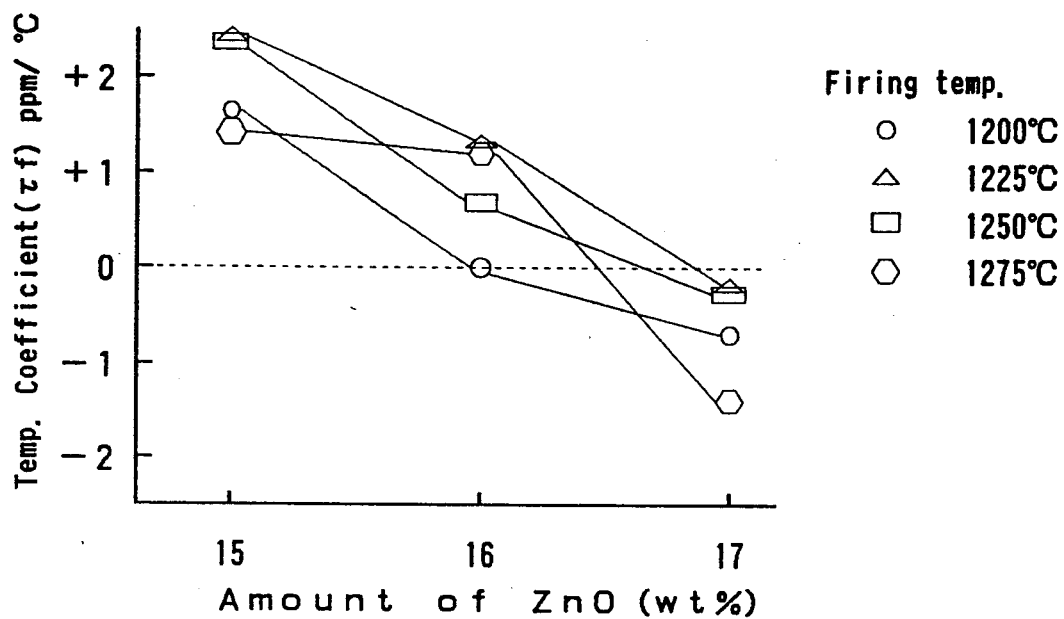
FIG. 3 is a graph showing the relationship between the τf value and the amount of ZnO at different sintering temperatures for the BaO-3.7TiO$_2$-based dielectric ceramic composition.
Figure 4:
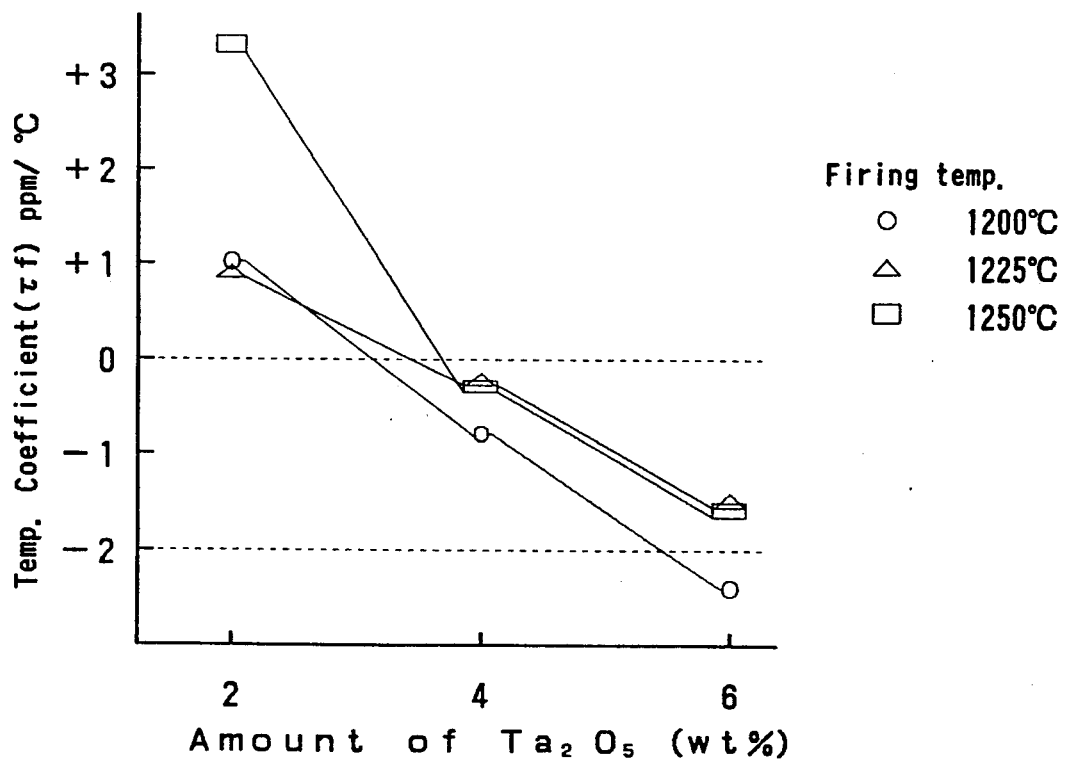
FIG. 4 is a graph showing the relationship between the τf value and the amount of Ta$_2$O$_5$ at different sintering temperatures for the BaO-3.7TiO$_2$-based dielectric ceramic composition.
Figure 5:
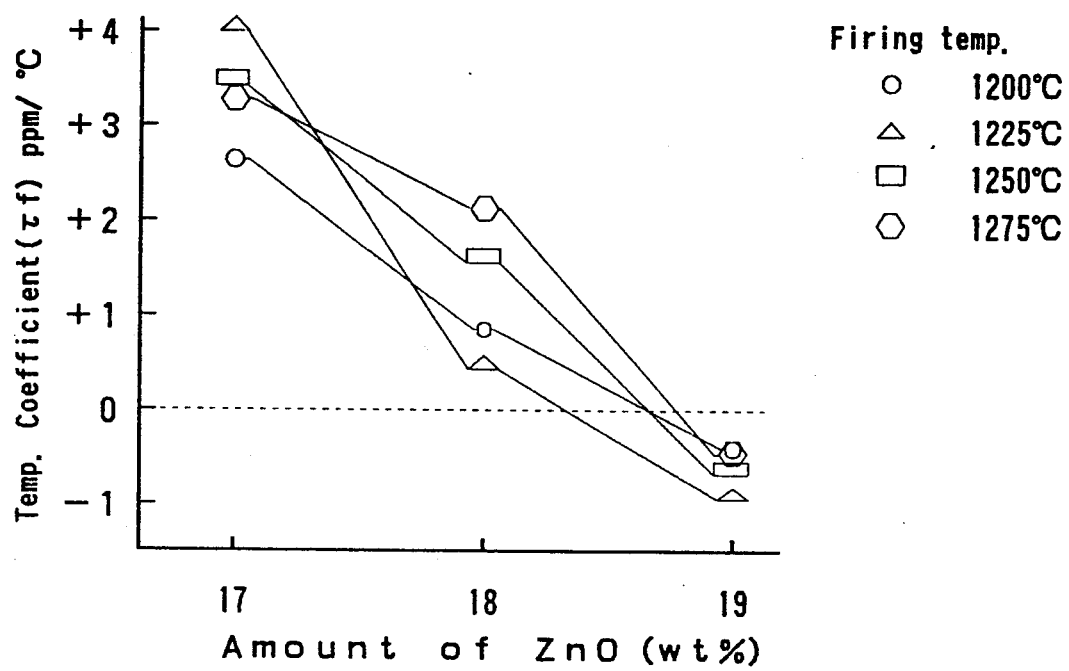
FIG. 5 is a graph showing the relationship between the τf value and the amount of ZnO at different sintering temperatures for the BaO-3.6TiO$_2$-based dielectric ceramic composition.
Figure 6:
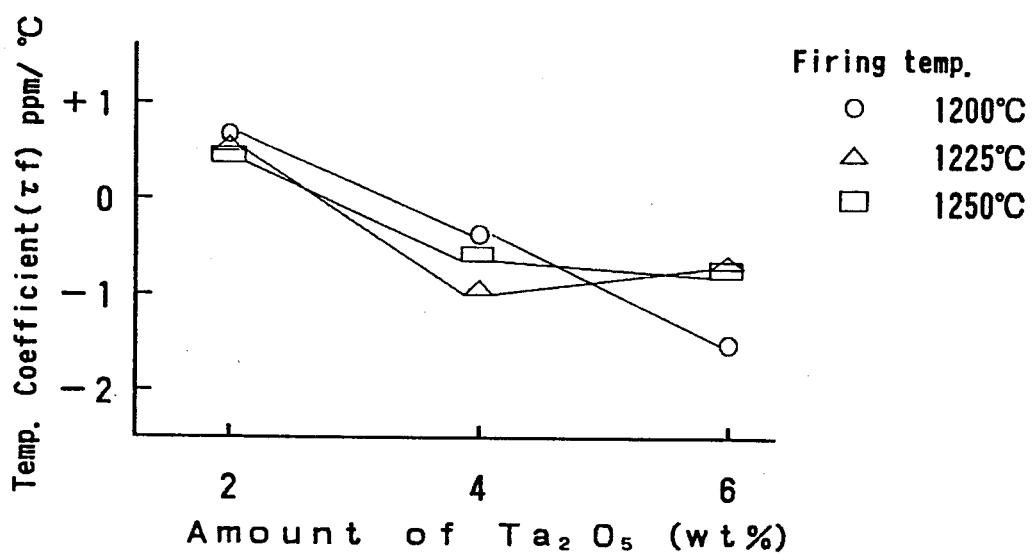
FIG. 6 is a graph showing the relationship between the τf value and the amount of Ta$_2$O$_5$ at different sintering temperatures for the BaO-3.6TiO$_2$-based dielectric ceramic composition.

The characteristic properties of the samples are shown in Tables 1 to 6 and FIGS. 1 to 6. Incidentally, Tables 1 and 2 and FIGS. 1 and 2 are concerned with BaO-3.8TiO$_2$-based Tables 3 and 4 and FIGS. 3 and 4 are concerned with BaO-3.7TiO$_2$-based compositions; and Tables 5 and 6 and FIGS. 5 and 6 are concerned with BaO-3.6TiO$_2$ compositions.

These results indicate the following.

The BaO-3.8TiO$_2$-based samples (in Tables 1 and 2 and FIGS. 1 and 2) gave $\tau f$ values in the range of −1.09 to +3.85 ppm/°C., which are small and close to zero. The $\tau f$ value changes from positive to negative as the amount of ZnO and Ta$_2$O$_5$ increases. It is a positive value close to zero when the amount of Ta$_2$O$_5$ is 4 wt % and the amount of ZnO is 14 wt %. In other words, it is close to zero when the amount of ZnO is 14–16 wt % and the amount of Ta$_2$O$_5$ is 4–6 wt %.

The BaO-3.7TiO$_2$-based samples (in Tables 3 and 4 and FIGS. 3 and 4) gave $\tau f$ values in the range of −2.37 to +3.36 ppm/°C., which are small and close to zero. The $\tau f$ value changes from positive to negative as the amount of ZnO and Ta$_2$O$_5$ increases. It is a negative value close to zero when the amount of Ta$_2$O$_5$ is 4 wt % and the amount of ZnO is 17 wt %. In other words, it is close to zero when the amount of ZnO is 16–17 wt % and the amount of Ta$_2$O$_5$ is 2–4 wt %.

The BaO-3.6TiO$_2$-based samples (in Tables 5 and 6 and FIGS. 5 and 6) gave $\tau f$ values in the range of −1.49 to +3.54 ppm/°C., which are small and close to zero. The $\tau f$ value changes from positive to negative as the amount of ZnO and Ta$_2$O$_5$ increases. It is a negative value close to zero when the amount of Ta$_2$O$_5$ is 4 wt % and the amount of ZnO is 19 wt %. In other words, it is close to zero when the amount of ZnO is 18–19 wt % and the amount of Ta$_2$O$_5$ is 2–4 wt %.

Moreover, it is noted that Qu tends to decrease and $\epsilon r$ tends to increase with the increasing firing temperature. The BaO-3.8TiO$_2$-based samples gave Qu values in the measurable range of 2330–3250, $\epsilon r$ values in the range of 29.55–33.41, and firing densities in the range of 4.43–4.77 g/cm$^3$ (high enough for practical use).

The BaO-3.7TiO$_2$-based samples gave Qu values in the measurable range of 2510–3210, $\epsilon r$ values in the range of 27.7–33.7, and firing densities in the range of 4.30–4.86 g/cm$^3$ (except sample No. 38, high enough for practical use). In addition, all the samples (except No. 38) gave sufficiently compact sintered bodies even at comparatively low firing temperatures, 1175° C. and 1200° C. Incidentally, $\epsilon r$ values tend to be low when the firing density is low. Presumably, this is due to incomplete densification.

The BaO-3.6TiO$_2$-based samples gave Qu values in the measurable range of 2300–2990 (except sample No. 65 fired at 1175° C.), $\epsilon r$ values in the measurable range of 29.2–33.2, and firing densities in the measurable range of 4.50–4.86 g/cm$^3$ (except samples Nos. 64 and 66, high enough for practical use). In addition, all the samples (except Nos. 64 and 66) gave sufficiently compact sintered bodies even at comparatively low firing temperatures, 1175° C. and 1200° C.

Obviously many modifications and variations of the present invention are possible in the light of the above teachings. In other words, the calcination and firing may be carried out under various conditions, and the BaCO$_3$ as a raw material of BaO may be replaced by a peroxide, hydroxide, or nitrate.

What is claimed is:

1. A ceramic composition for microwave dielectric which comprises a principal component composed of BaO, TiO$_2$, and ZnO, and a secondary component, said principal component being represented by (BaO-3.8TiO$_2$).xZnO, where x is in the range of $12 \leq x \leq 16$ wt % based on the amount of BaO-3.8TiO$_2$, said secondary component containing 2–6 wt % Ta$_2$O$_5$ based on the amount of the principal component.

2. A ceramic composition for microwave dielectric which comprises a principal component composed of BaO, TiO$_2$, and ZnO, and a secondary component, said principal component being represented by (BaO-3.7TiO$_2$).xZnO, where x is in the range of $15 \leq x \leq 17$ wt % based on the amount of BaO-3.7TiO$_2$, said secondary component containing 2–6 wt % Ta$_2$O$_5$ based on the amount of the principal component.

3. A ceramic composition for microwave dielectric which comprises a principal component composed of BaO, TiO$_2$, and ZnO, and a secondary component, said principal component being represented by (BaO-3.6TiO$_2$).xZnO, where x is in the range of $17 \leq x \leq 19$ wt % based on the amount of BaO-3.6TiO$_2$, said secondary component containing 2-6 wt % $Ta_2O_5$ based on the amount of the principal component.

4. A ceramic composition for microwave dielectric which comprises a principal component composed of BaO, $TiO_2$, and ZnO, and a secondary component, said principal component being represented by (BaO-$3.7\sim3.8TiO_2$).xZnO, where x is in the range of $12\leq x\leq17$ wt % based on the amount of BaO-$3.7\sim3.8TiO_2$, said secondary component containing 2-6 wt % $Ta_2O_5$ based on the amount of the principal component, and a temperature coefficient of resonance frequency $\tau f$ values is in the range of $-5$ to $+5$ ppm/°C.

5. A ceramic composition for microwave dielectric which comprises a principal component composed of BaO, $TiO_2$, and ZnO, and a secondary component, said principal component being represented by (BaO-$3.6\sim3.7TiO_2$).xZnO, where x is in the range of $15\leq x\leq19$ wt % based on the amount of BaO-$3.6\sim3.7TiO_2$, said secondary component containing 2-6 wt % $Ta_2O_5$ based on the amount of the principal component, and a temperature coefficient of resonance frequency $\tau f$ values is in the range of $-5$ to $+5$ ppm/°C.

6. A ceramic composition for microwave dielectric as defined in any of claims 1 to 5, which further comprises $MnO_2$ in an amount not more than 1 wt % of the amount of the ceramic composition.

* * * * *

UNITED STATES PATENT AND TRADEMARK OFFICE
CERTIFICATE OF CORRECTION

PATENT NO. : 5,238,887
DATED : August 24, 1993
INVENTOR(S) : Tokiomi KATO et al.

It is certified that error appears in the above-indentified patent and that said Letters Patent is hereby corrected as shown below:

Claim 1, column 8, line 51, change "$O_2$) .xZnO" to --$O_2$) • xZnO--.

Claim 2, column 8, line 59, change "$O_2$) .xZnO" to --$O_2$) • xZnO--.

Claim 3, column 8, line 67, change "$O_2$) .xZnO" to --$O_2$) • xZnO--.

Claim 4 column 9, line 7, "3.7~3.8$TiO_2$) .xZnO" to --3.7~3.8$TiO_2$) • xZnO--.

Claim 5, column 10, line 3, change "3.6~3.7$TiO_2$)" to --3.6~3.7$TiO_2$) • xZnO--.

UNITED STATES PATENT AND TRADEMARK OFFICE
CERTIFICATE OF CORRECTION

PATENT NO.  : 5,238,887
DATED       : August 24, 1993
INVENTOR(S) : Tokiomi Kato et al.

It is certified that error appears in the above-indentified patent and that said Letters Patent is hereby corrected as shown below:

On title page, item [57]

Abstract, line 9, change "(BaO-3.7TiO$_2$) .xZnO" to --BaO-3.7TiO$_2$) • xZnO--.

Signed and Sealed this

Eighth Day of November, 1994

Attest:

BRUCE LEHMAN

Attesting Officer

Commissioner of Patents and Trademarks